(12) United States Patent
Dajaku

(10) Patent No.: US 9,564,781 B2
(45) Date of Patent: Feb. 7, 2017

(54) ELECTRIC MACHINE

(75) Inventor: Gurakuq Dajaku, Neubiberg (DE)

(73) Assignee: FEAAM GMBH, Neubiberg (DE)

( * ) Notice: Subject to any disclaimer, the term of this patent is extended or adjusted under 35 U.S.C. 154(b) by 184 days.

(21) Appl. No.: 13/984,494

(22) PCT Filed: Feb. 9, 2012

(86) PCT No.: PCT/DE2012/100027
§ 371 (c)(1),
(2), (4) Date: Oct. 24, 2013

(87) PCT Pub. No.: WO2012/107035
PCT Pub. Date: Aug. 16, 2012

(65) Prior Publication Data
US 2014/0035425 A1    Feb. 6, 2014

(30) Foreign Application Priority Data
Feb. 11, 2011   (DE) .......... 10 2011 011 023

(51) Int. Cl.
*H02K 3/28* (2006.01)
*H02K 3/12* (2006.01)
*H02K 23/24* (2006.01)

(52) U.S. Cl.
CPC ..... *H02K 3/28* (2013.01); *H02K 3/12* (2013.01); *H02K 23/24* (2013.01)

(58) Field of Classification Search
CPC ........... H01F 15/00; H02K 3/28; H02K 23/24; H02K 3/12
USPC .................. 310/12.22, 186, 195, 198, 269
See application file for complete search history.

(56) References Cited

U.S. PATENT DOCUMENTS

| 2007/0200449 A1* | 8/2007 | Hayashi et al. ............. 310/180 |
| 2008/0012444 A1 | 1/2008 | Hattori |
| 2011/0278973 A1* | 11/2011 | Utaka ................. H02K 3/12 310/71 |

FOREIGN PATENT DOCUMENTS

| CN | 101128970 A | | 2/2008 | |
| DE | 102007007578 A1 | | 9/2007 | |
| DE | 102006043673 | * | 3/2008 | |
| DE | 102008051047 A1 | | 4/2010 | |
| DE | 102008057349 B3 | | 7/2010 | |
| JP | 10-146030 | * | 5/1998 | |
| JP | 11-041847 | * | 2/1999 | ............ H02K 3/18 |
| JP | WO2010013433 | * | 2/2010 | ............ H02K 3/28 |

OTHER PUBLICATIONS

Linear Electric Machines—A personal view—Eric R. Laithwaite, IEEE Feb. 1975, vol. 63 No. 2.*

(Continued)

*Primary Examiner* — Terrance Kenerly
(74) *Attorney, Agent, or Firm* — McDermott Will & Emery LLP

(57) ABSTRACT

The proposed principle relates to an electric machine having a stator (1) and a rotor (2) that can move relative to the stator. The stator (1) comprises a first and at least one second winding system (4, 5) that have coils, each of which is placed in stator slots (3) and is wound around stator teeth (6). The first winding system (4) and the second winding system (5) each have at least one tooth (7) around which no coil is wound. When combining the first and second winding system (4, 5), all teeth of the stator (1) have coils wound around them.

13 Claims, 10 Drawing Sheets

(56) References Cited

OTHER PUBLICATIONS

Figure 1:
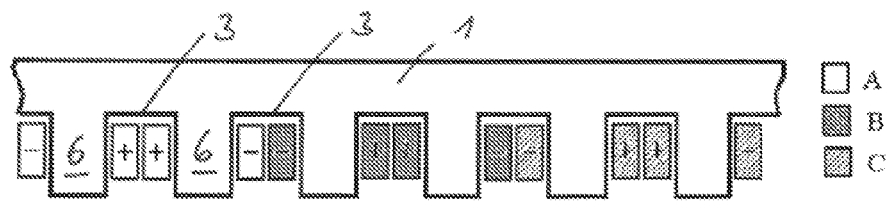

DE102006043673 A1, ESPACENET english translation.*
Machine translation of Nishiyama et al., Feb. 2010, WO2010013433.*
Machine translation of Kenji et al., Feb. 1999, JP11-041847.*

* cited by examiner

ELECTRIC MACHINE

The present invention relates to an electric machine.

Electric machines usually comprise a housing-fixed stator as well as a rotor that can move relative to the stator. The rotor may be supported, for instance, so as to be rotatable or linearly displaceable relative to the stator.

Electric machines are assigned to the electromechanical energy converters. They may operate as a motor or as a generator.

Electric machines may be used for powering motor vehicles, for instance. Here, particular properties of the operational behavior of the electric machine are desired. These include, for example, the torque, the acoustic properties, the iron losses as well as the losses in permanent magnets (if used), and the losses in electric windings. Compared to electric machines with distributed windings, those with concentrated windings are distinguished by a compact design and a simplified manufacturing.

In particular in vehicle drive systems, multi-phase machines prevail, predominantly those with three electric phases or strands. A three-phase machine can be connected to an electric three-phase system with three phases which are shifted relative to one another by 120° in each case.

The magnetomotive force (MMF) which is produced by the stator in operation can be analyzed for a specific type of winding. In doing so, the magnetomotive force is split up in its harmonic components, for instance by means of a Fourier decomposition. All harmonic components except for that one which is used as the operating wave of the electric machine are undesired, as they may result in losses and further may cause undesired, in particular acoustic impairments.

According to the documents DE 10 2008 051 047 A1 and DE 10 2008 057 349 B3, several windings are combined with each other in a stator in order to reduce specific higher harmonic and/or subharmonic waves of the magnetomotive force. DE 10 2008 057 349 B3 shows a concentrated winding.

It is the objective of the present invention to provide an electric machine in which undesired harmonic components of the electromotive force can be reduced with small expenditure.

The invention is solved by an electric machine comprising the features of claim 1. Further developments and configurations are specified in the dependent claims.

In one embodiment, the electric machine comprises a stator and a rotor that can move relative to the stator. The stator comprises at least two winding systems. The winding systems comprise coils which are inserted in slots of the stator in each case. Teeth are formed between adjoining slots of the stator and the coils are wound around said teeth. The first winding system and the second winding system each comprise at least one winding-free tooth before the winding systems are combined with each other. Having combined the two winding systems in the common stator, all teeth of the stators are provided with a winding. This means that each tooth of the stator is either provided with only one coil of the first winding system or only one coil of the second winding system or with one coil each of the first and second winding systems.

In other words, at least one winding-free tooth is inserted in the first winding system and at least one winding-free tooth is inserted in the second winding system as well, with the winding-free teeth of the first and second winding systems being different teeth of the stator. Thus, a combination of the two winding systems brings about that no tooth of the stator remains winding-free.

If the distribution of the magnetomotive force and of the corresponding harmonic waves are analyzed for such an electric machine, one can see that undesired harmonic waves of the magnetomotive force are significantly reduced. Here, all those harmonic components are regarded as undesired which are not used as a working wave. These may be higher harmonic waves and/or sub-harmonic waves, with the terms higher and sub- each being related to the order of the harmonic waves related to the order of the harmonic wave used as the working wave.

It is preferred that the first and second winding systems are designed such that they comprise concentrated coils in each case, said coils being wound around exactly one tooth of the stator. This is referred to as a concentrated winding. This results in a particularly simple way of manufacturing the winding and the entire machine.

In the present case, a concentrated winding is understood to be a winding in which the turns or coils around each single tooth are concentrated, i.e. do not overlap each other within one winding system. The proposed principle is preferably used with an electric machine comprising nine slots and four poles. Further, the proposed principle can be advantageously used with a machine comprising 18 slots and ten poles. In this context, the poles are understood to be magnetic poles of the rotor which comprise north and south poles. A machine with ten poles correspondingly has five pairs of poles, as each pair of poles comprises one north pole and one south pole. Any multiples of the mentioned numeral values are possible, too.

In one embodiment, a one-layer winding and a multi-layer winding are combined with each other in the first and second winding systems with the proposed principle.

It is possible to combine more than two winding systems with one another.

For realizing a multi-phase electric machine, the first and second winding systems each preferably have several electric phases. Here, each electric phase of an electric power system to which the electric machine can be connected has one electric phase of each winding system associated to it.

In one embodiment, in each winding system the at least one winding-free tooth is arranged between teeth which are provided with coils that are associated to different electric phases of this winding system.

As an alternative, the at least one winding-free tooth of each winding system may be arranged between teeth which are provided with coils that are associated to the same electric phase of this winding system.

In a further development of the proposed principle, directly adjoining coils of the same electric phase and of the same winding system exhibit different winding numbers. This allows to specifically reduce particular higher harmonic waves of the Fourier decomposition of the magnetomotive force to zero or near zero.

The first and second winding systems preferably have the same construction, in particular the same winding topology.

It is preferred that the first and second winding systems are electrically connected to each other.

In one embodiment, the first and second winding systems are mechanically shifted relative to each other by a defined electric angle. For practical reasons, shifting the winding systems relative to each other preferably occurs by a defined integer number of slots of the stator.

In one embodiment, the first and second winding systems are serially connected in phase and are fed by a common inverter providing the electric power system.

In case the stator comprises a third winding system, the latter may be mechanically shifted, too.

It is preferred that a mechanical shifting of a third and a fourth winding system occurs, which likewise are shifted relative to each other, related to the combination of first and second winding systems and by the same electric angle by which the second winding system is shifted relative to the first winding system and the fourth winding system is shifted relative to the third winding system.

The rotor may comprise, for example, one of the following types: a cage rotor, a multi-layer rotor, a permanent magnet rotor, a rotor with buried magnets.

The electric machine may be designed so as to comprise an internal rotor or as a machine with an external rotor.

The electric machine may comprise one of the following types: a linear machine, a radial flux machine, an axial flux machine, an asynchronous machine, a synchronous machine, a brushless DC machine.

It is preferred that the fundamental wave is not used as the working wave of the electric machine.

Figure 2:
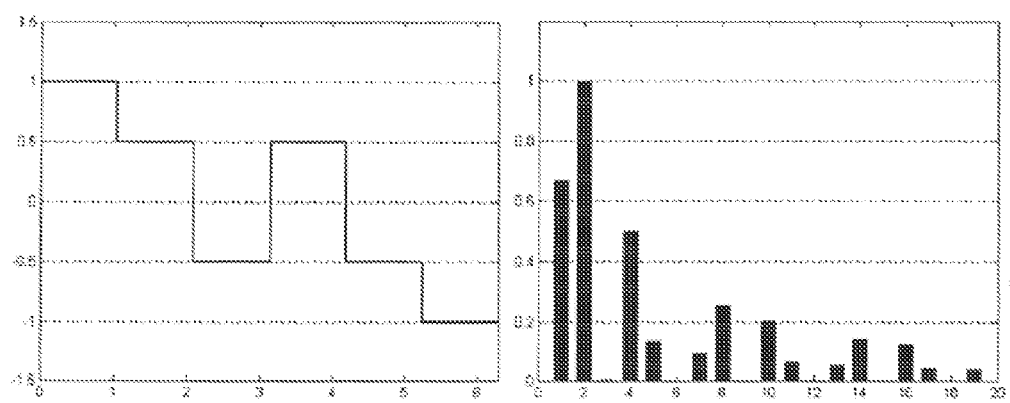
Figure 3:
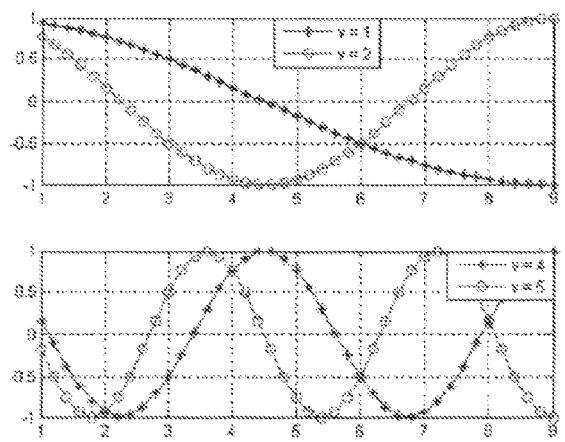
Figure 4:
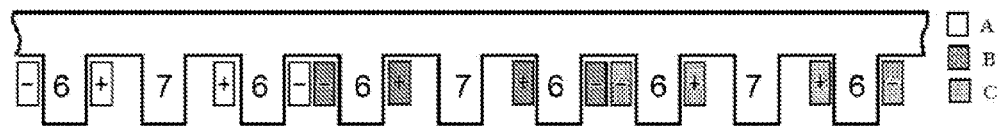
Figure 5:
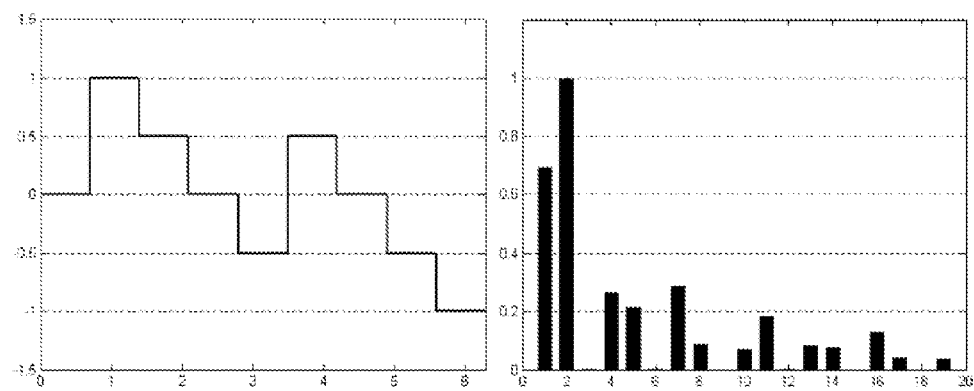
Figure 6:
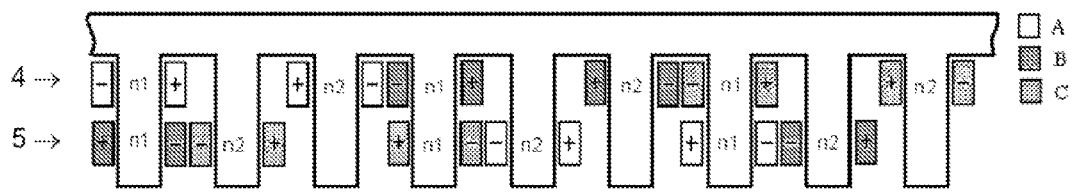
Figure 7:
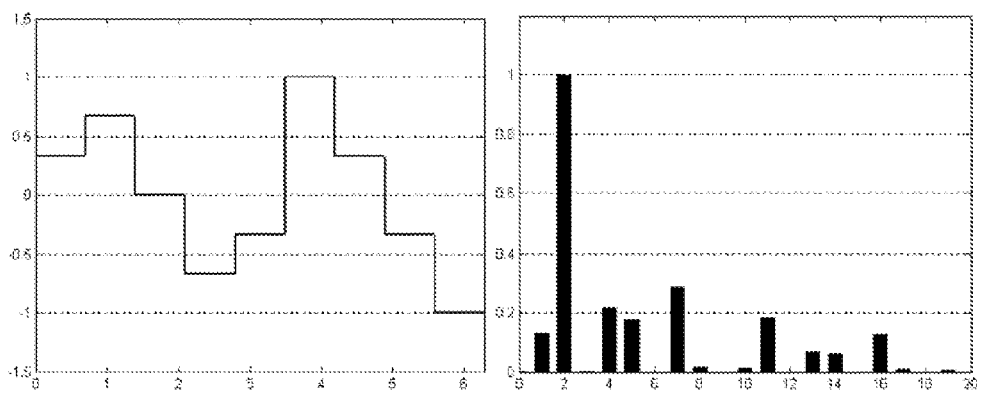
Figure 8:
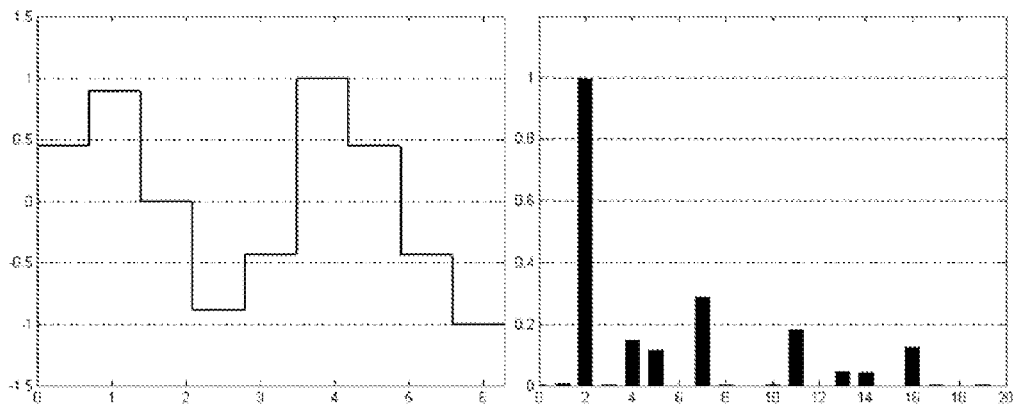
Figure 9:
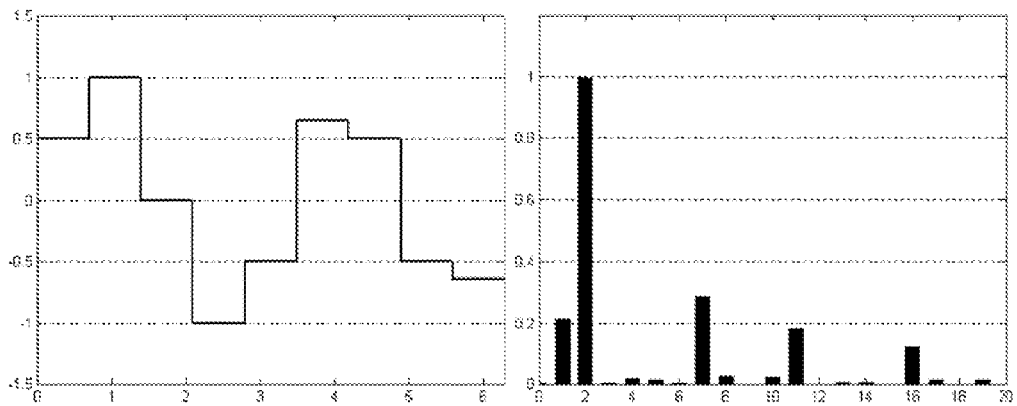
Figure 10:
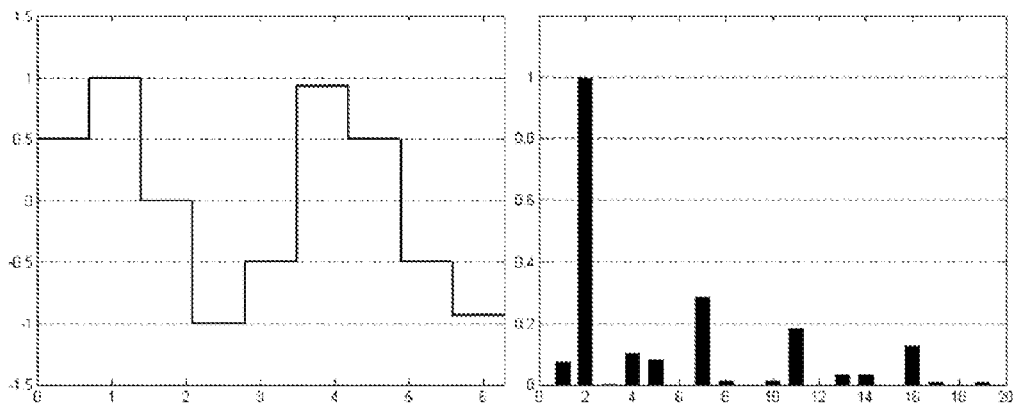
Figure 11:
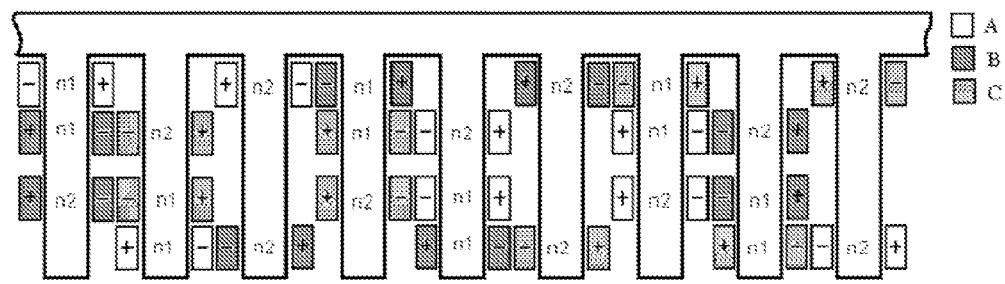
Figure 12:
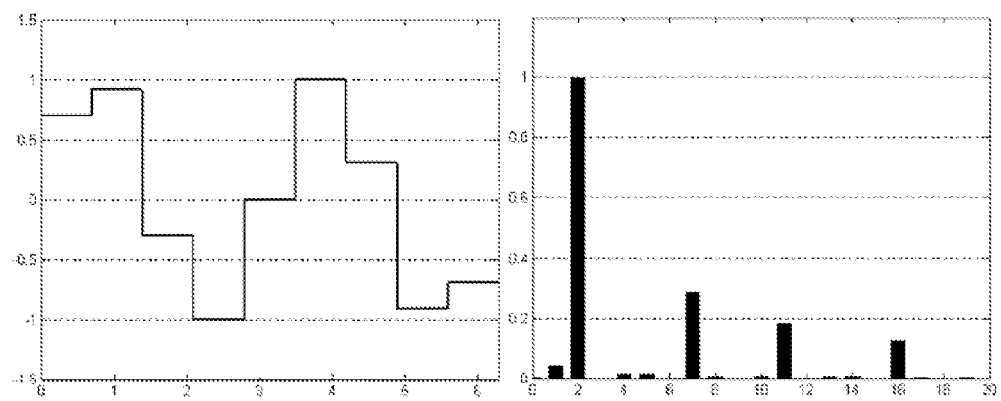
Figure 13:
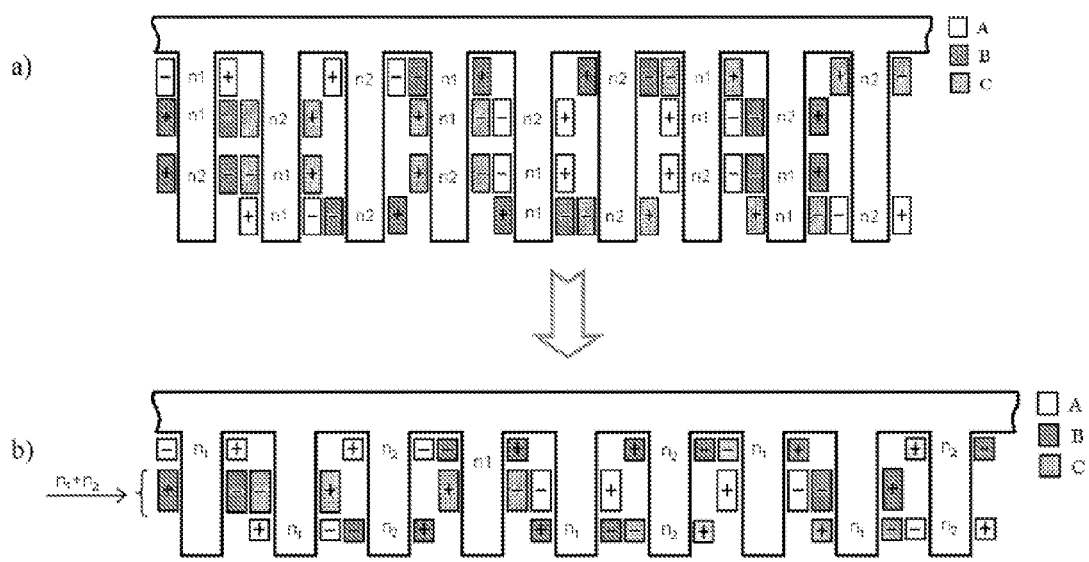
Figure 14:
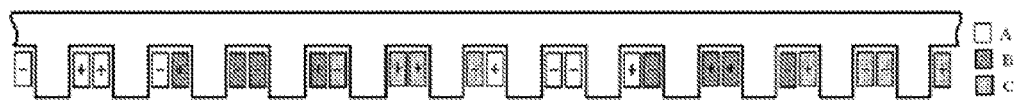
Figure 15:
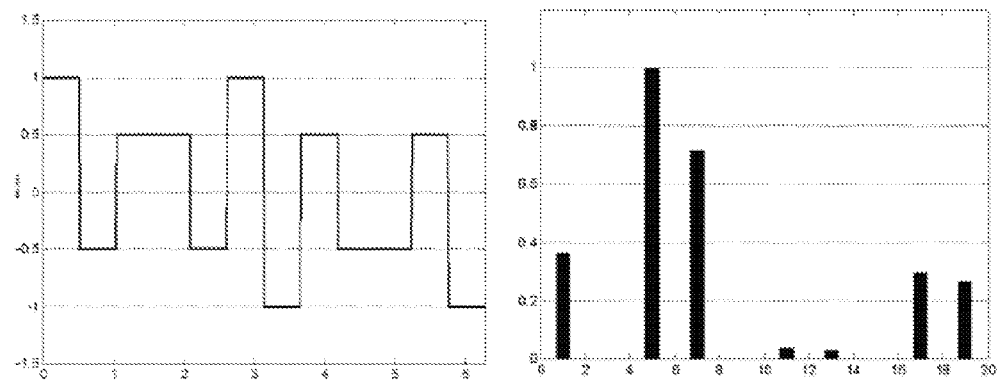
Figure 16:
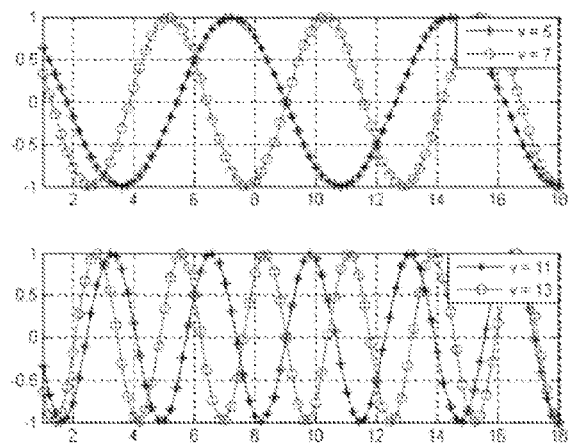
Figure 17:
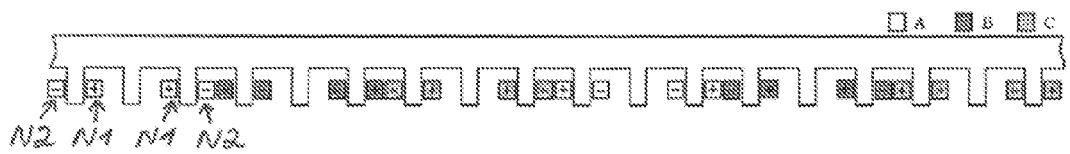
Figure 18:
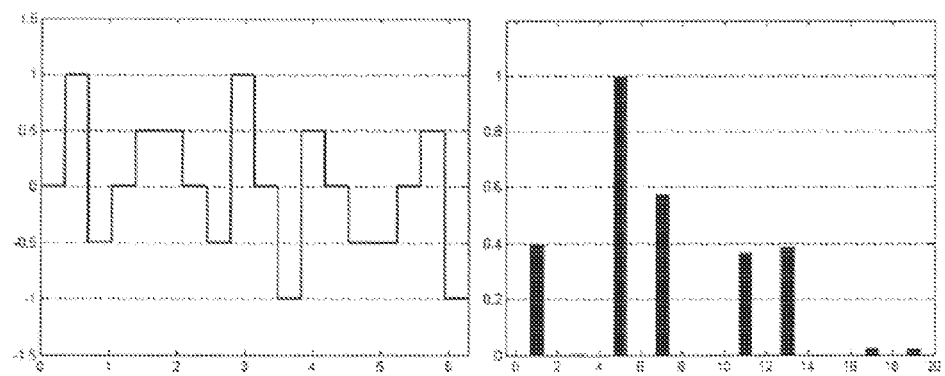
Figure 19:
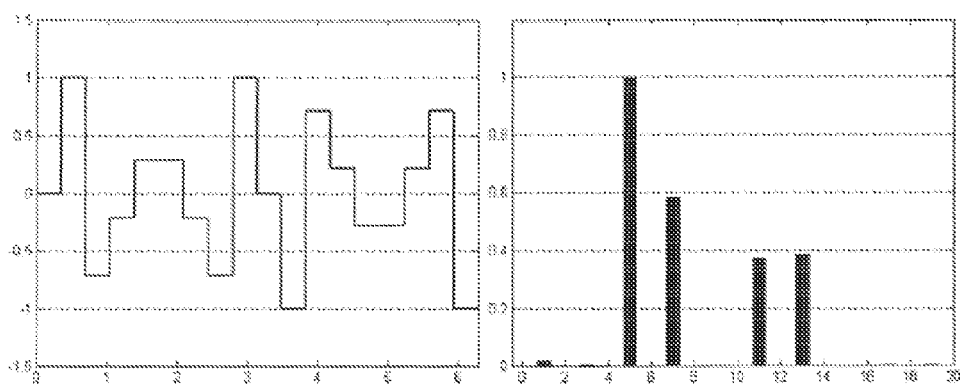
Figure 20:
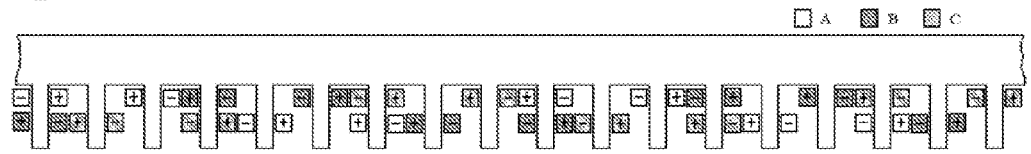
Figure 21:
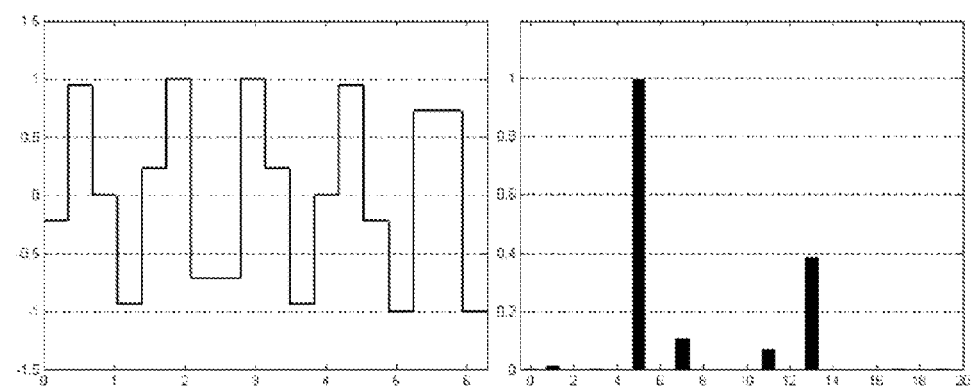
Figure 22:
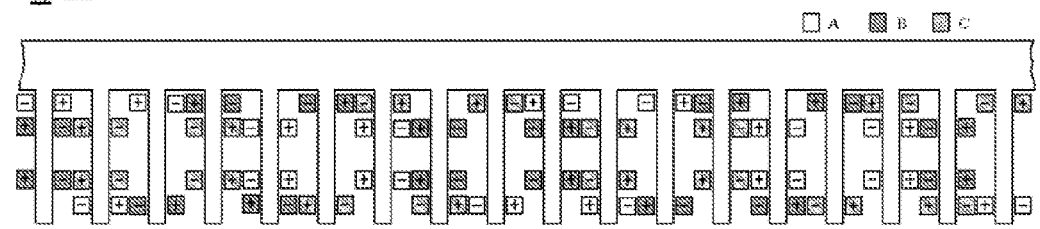
Figure 23:
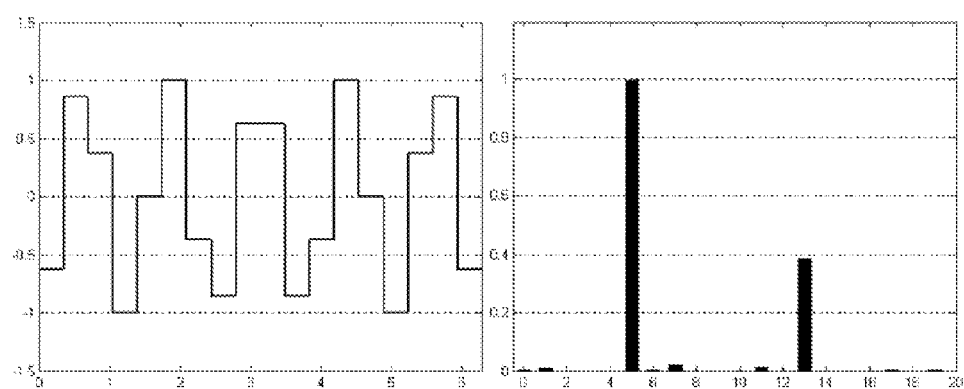
Figure 24:
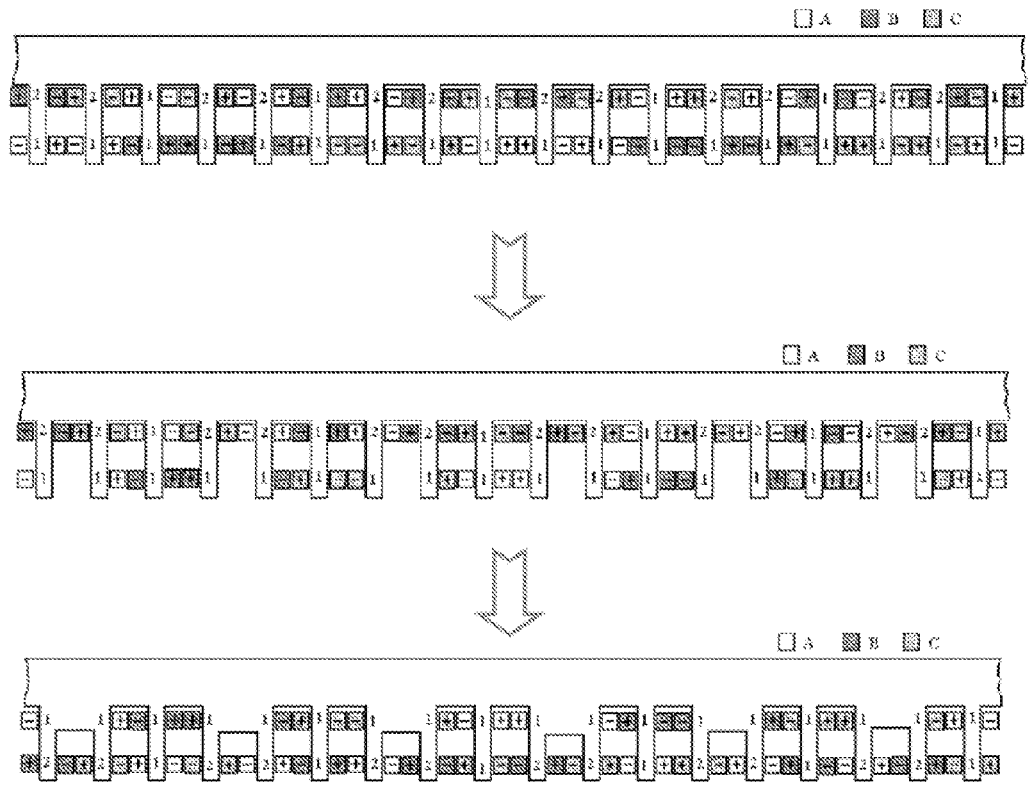
Figure 25:
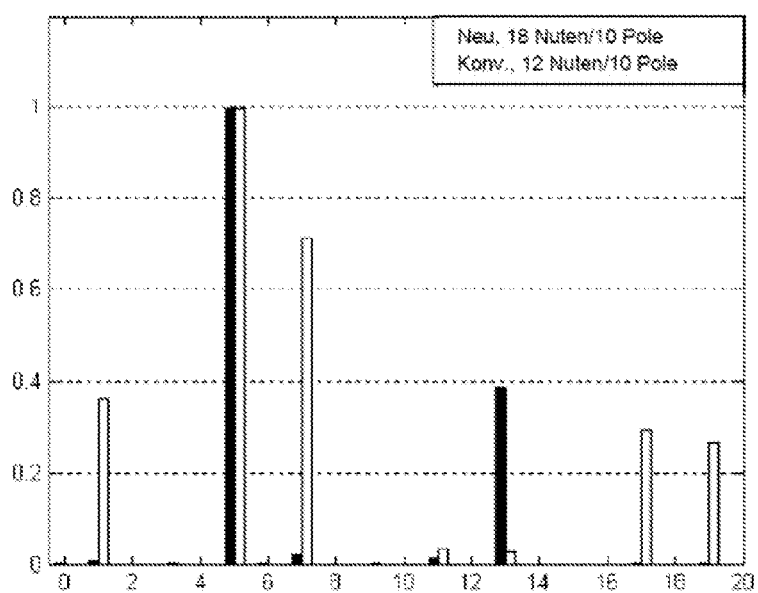
Figure 26:
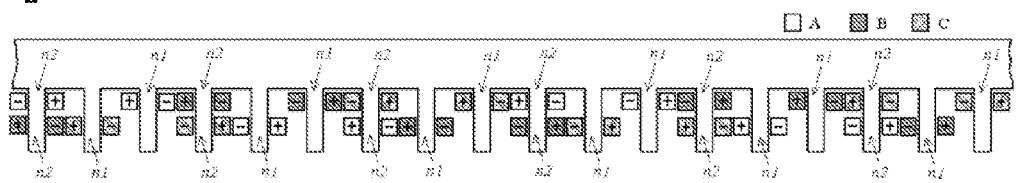
Figure 27:
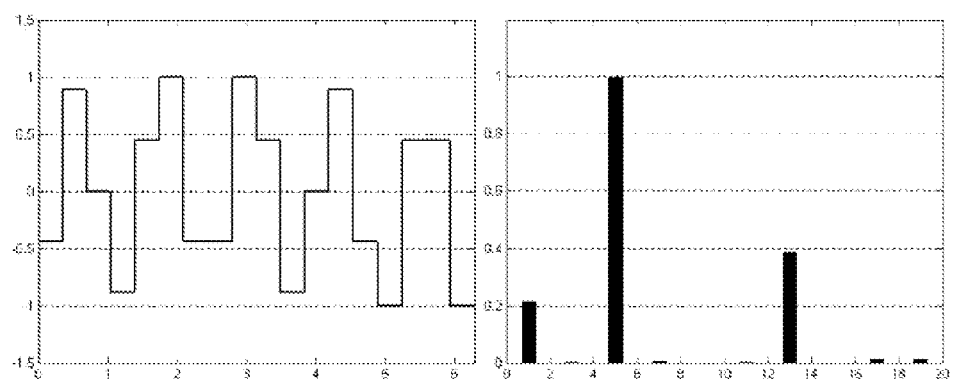
Figure 28:
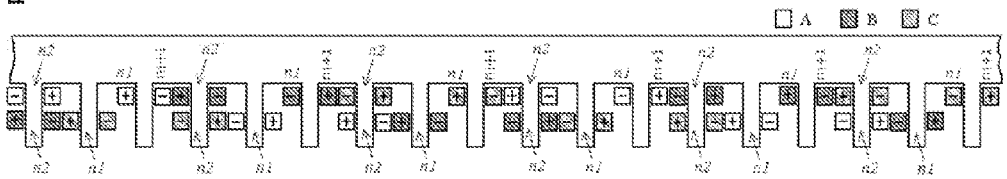
Figure 29:
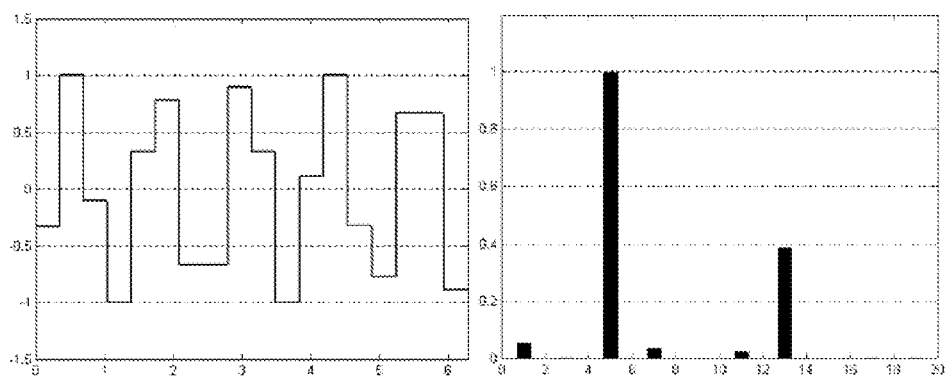
Figure 30:
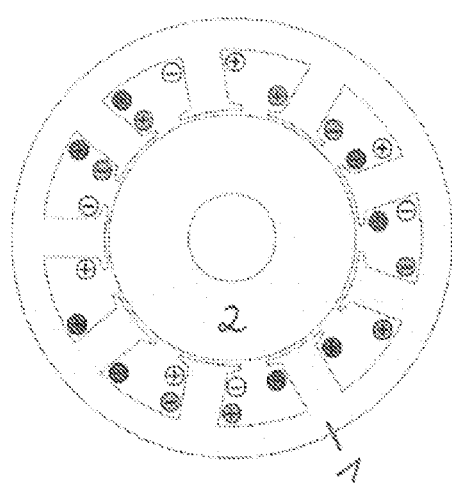
Figure 31:
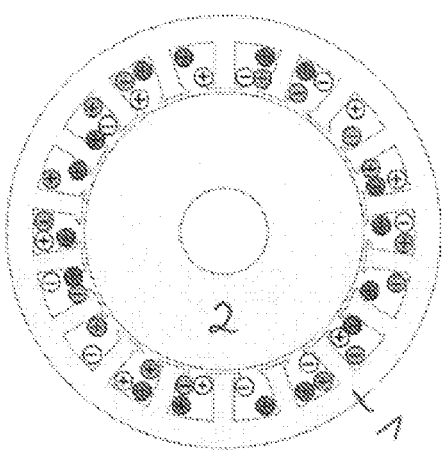

The invention will be explained below on the basis of several exemplary embodiments with the aid of drawings in which:

FIG. 1 shows an exemplary conventional winding topology for a three-phase winding for a stator with six slots and a number of two adjoining coils per phase, FIG. 2 shows the distribution of the magnetomotive force and of corresponding harmonic waves in their Fourier analysis pertaining to the winding topology of FIG. 1, FIG. 3 shows factors of influence on the magnetomotive force plotted versus a shift angle, FIG. 4 shows a transformation of the topology of FIG. 1 to a winding topology with nine slots, FIG. 5 shows the associated distribution of the magnetomotive force and of corresponding harmonic waves in their Fourier analysis, FIG. 6 shows an exemplary combination of two winding systems according to FIG. 4 according to the proposed principle, which are mechanically shifted relative to each other by an electric angle, FIG. 7 shows the distributions, pertaining to FIG. 6, of the magnetomotive force and of corresponding harmonic waves in their Fourier analysis, FIG. 8 shows the distribution of the magnetomotive force and of corresponding harmonic waves in their Fourier analysis according to the implementation of FIG. 6 if different winding numbers are used in the ratio 3/4, FIG. 9 shows the ratios of FIG. 8, but for a winding number ratio of 3/7, FIG. 10 shows the ratios of FIG. 9, but for a winding number ratio of 5/8, FIG. 11 is an exemplary embodiment of the proposed principle on the basis of a combination of two combined winding systems according to FIG. 6, the combined winding systems of FIG. 6 in turn being mechanically shifted relative to each other by an electric angle, FIG. 12 shows the distribution of the magnetomotive force and corresponding harmonic waves in their Fourier analysis for the implementation with four winding systems according to FIG. 11 with a winding number ratio of 3/7, FIG. 13 shows the transition from a four-layer winding to an equivalent three-layer winding by means of an exemplary implementation of the proposed principle, FIG. 14 is another exemplary embodiment, first starting from a winding topology with twelve slots and two coil sets each with two adjoining coils of one strand and three phases, FIG. 15 shows the distribution of the magnetomotive force and corresponding harmonic waves in their Fourier analysis according to the implementation of FIG. 14, FIG. 16 shows factors of influence on the magnetomotive force plotted versus the shift angle for differing numbers of stator slots, FIG. 17 shows a transformation of the winding topology from FIGS. 14 to 18 slots by inserting winding-free teeth, FIG. 18 shows the associated distribution of the magnetomotive force and corresponding harmonic waves in their Fourier analysis, FIG. 19 is the distribution according to FIG. 18, but for different winding numbers, FIG. 20 shows an exemplary implementation according to the proposed principle by means of an example of a combination of two winding topologies of FIG. 17 which are mechanically shifted relative to each other, FIG. 21 shows the distribution of the magnetomotive force and of corresponding harmonic waves in their Fourier analysis of the implementation of FIG. 20, FIG. 22 is an exemplary implementation of the proposed principle on the basis of a combination of two mutually shifted winding system combinations according to FIG. 20 to form a four-layered winding, FIG. 23 shows the associated diagrams of the magnetomotive force and the decomposition of the corresponding harmonic waves in their Fourier analysis pertaining to FIG. 22, FIG. 24 shows a further embodiment of the proposed principle by means of a simplification of the winding system, FIG. 25 is an exemplary comparison between the corresponding harmonic waves of the magnetomotive force according to the proposed principle and the conventional principle, FIG. 26 shows an exemplary further development of the implementation of FIG. 20 with different winding numbers, according to the proposed principle, FIG. 27 shows diagrams of the magnetomotive force and the corresponding harmonic waves in their Fourier analysis for the example according to FIG. 26, FIG. 28 is an alternative embodiment of the proposed principle with respect to the implementation of FIG. 26 with different winding numbers of the same coils in adjoining slots, FIG. 29 shows the diagrams, pertaining to the example of FIG. 28, of the magnetomotive force and the corresponding harmonic waves in their Fourier analysis, FIG. 30 shows an application of an exemplary stator according to the proposed principle in an electric machine and FIG. 31 is a further example of an electric machine comprising a stator according to the proposed principle.

FIG. 1 shows a topology of a winding system with three phases A, B, C. The number of the electric phases of the electric winding system according to FIG. 1 amounts to three and hence corresponds to the number 3 of the electric phases of an electric system to which the three-string winding system can be connected. The number of the electric phases is identified by m.

A stator 1 in which the winding system is installed comprises six slots. The number of the slots is designated with Z. For the purpose of simplifying the illustration, the stator 1 as well as the winding system installed therein are shown in a developed, linearized presentation, but alternatively may also be realized in a rotating machine comprising a stator of circular cross-section. With a linear machine, the illustrated stator section may repeat periodically.

Further, the electric winding according to FIG. 1 is distinguished in that it is a concentrated winding in which all coils of all electric phases A, B, C are each wound around exactly one tooth of the stator. Teeth 6 of the stator 1 are formed between adjoining slots 3. In the implementation according to FIG. 1, all slots and all teeth have the same geometrical dimensions. In this example, all coils of all electric phases of the winding system have equal winding numbers, too.

The winding according to FIG. 1 always comprises two adjoining coils +, − of the same electric phase A, B, C. This number of the coils of the same phase is designated with the symbol n.

Adjoining coils of the same electric phase A, B, C are always wound in the opposite winding sense which is shown in the drawing by corresponding plus and minus symbols +, − from which the winding sense can be derived.

As a whole, the implementation according to FIG. 1 is a winding distribution with n=2, m=3, Z=6.

For the exemplary embodiment according to FIG. 1, FIG. 2 shows the distribution of the magnetomotive force MMF over 360 degrees in the left half of the picture and the distribution of the harmonic waves of this magnetomotive force in the right half of the picture, resulting, for instance, from a Fourier analysis.

FIG. 3 shows factors of influence on the electromotive force plotted versus the number of the slots of the stator on the basis of a family of parameters for different quantities of a mechanical shifting by an integer number of slots. Here, two winding systems such as e.g. with the construction according to FIG. 1 are shifted relative to each other as is explained in document DE 10 2008 051 047 A1, for example. In this respect, reference is made to this document in its entirety.

It is to be seen that a mechanical shifting by four slots reduces the first harmonic wave, i.e. the fundamental wave, by approximately 75% and the fourth and fifth higher harmonic wave by approximately 25%.

This means that using a stator topology with nine slots allows to improve the performance of a winding system for n=2 and m=3 by combining two identical concentrated winding systems with each other which are shifted relative to each other.

The distribution of the factors of influence on the electromotive force in FIG. 3 can be calculated according to the formula:

$$^v\xi_Z = \cos\left(v \cdot \frac{\alpha_w}{2}\right) = \cos\left(v \cdot \frac{2\pi}{Q_S} \cdot k_Q\right)$$

$$k_Q = 1, 2, 3, \ldots, Q_S$$

Here, $\alpha_w$ designates the electric shift angle by which the winding systems are shifted relative to each other, for instance by four slots.

If the winding topology of FIG. 1 is transformed to a stator comprising nine slots according to FIG. 4, there appear teeth 7 which are completely void of any winding. Starting from FIG. 1, the winding-free teeth in the example of FIG. 4 are always inserted between such teeth 6 which belong to the same phase A, B, C of the respective winding system.

In correspondence to FIG. 2, FIG. 5 shows the distribution of the magnetomotive force and the harmonic waves associated to FIG. 4.

FIG. 6 shows a first exemplary embodiment of a stator for an electric machine according to the proposed principle. In this arrangement, the implementation of FIG. 6 is based on two identical winding systems according to the implementation of FIG. 4, which are mechanically shifted relative to each other by four slots. With regard to the construction of the two mutually shifted first and second concentrated electric winding systems, reference is made to the preceding exemplary embodiments which shall not be repeated here.

It can be seen that the first and second winding systems 4, 5 each comprise three phases, concentrated coils and two adjoining coils of the same phase of the same winding. The resulting winding is a two-layered winding. While the first and second winding system each comprise at least one winding-free tooth 7, none of these nine teeth 6, 7 remains without a winding in the combined two-layered winding according to FIG. 6.

FIG. 7 shows on the basis of the diagrams of the magnetomotive force and the harmonic waves that a significant reduction of undesired harmonic waves is possible with the implementation of FIG. 6. The second harmonic wave is used as the working wave. On the other hand, the first harmonic wave is an undesired subharmonic wave which is reduced by approximately 75%. Fourth and fifth harmonic waves representing higher harmonic waves with respect to the working wave are reduced by approximately 25%. This applies to the case of identical winding numbers n1, n2 for all coils of all phases A, B, C of all winding systems 4, 5 according to FIG. 6.

Compared with this, FIG. 8 shows an effect of a further development of FIG. 6, namely for a winding number ratio n1:n2 of 3/4. While this winding number ratio is 1 in FIG. 7, the winding number ratio n1:n2=3/4 results in a virtually complete elimination of the first harmonic wave. This means that the fundamental wave virtually disappears.

FIG. 9 shows the magnetomotive force and higher harmonic waves for the case that the winding number ratio is 3/7.

Similarly, FIG. 10 illustrates the ratios with a winding number ratio of 5/8. Whereas in FIG. 9 the fourth and fifth harmonic waves virtually disappear completely, FIG. 10 shows an implementation with significantly reduced fourth and fifth harmonic wave.

As is shown in FIG. 6, coils of the first and second winding numbers n1, n2 alternate in the implementations according to FIGS. 8 to 10, and one coil of each electric phase is realized with a first winding number whereas the associated second coil of the same electric phase is realized with a second winding number.

The exemplary embodiments of FIG. 6 to FIG. 10 exhibiting different winding numbers are each based on a two-layered, concentric winding topology of the type Z=9, n=2, m=3.

FIG. 11 shows a further development of the implementation of FIG. 6 according to the proposed principle, in which undesired harmonic waves are further reduced. Here, the two-layered winding according to FIG. 6 is doubled once again, the two combinations of winding systems which each are constructed according to FIG. 6 in turn being mechanically shifted relative to each other by four slots. In this combination according to FIG. 11, the first, fourth and fifth harmonic waves are again reduced by 75% and 25%, respectively. Thus, the first, fourth and fifth harmonic waves are reduced to virtually zero in practical applications as is apparent from the distribution of the magnetomotive force and the harmonic waves of the MMK according to FIG. 12.

FIG. 13 shows a simplification of the implementation of FIG. 11. The upper half of the picture of FIG. 13 corresponds to the implementation of FIG. 11. Combining the two middle layers and adding up the winding numbers n1, n2 of identical coils with the same winding sense and of the same phase results in the winding topology illustrated in the lower part of FIG. 13. Here, the four-layered winding system is transformed into a three-layered winding system. Here too, this is a winding with Z=9, n=2, m=3. The middle winding layer according to FIG. 13 in the lower half of the picture comprises coils with the sum of the winding numbers of the two middle layers of FIG. 11.

Starting from a conventional winding for a machine with six slots, the following steps in designing the machine are to be mastered, for example, in order to obtain according to the proposed principle e.g. a machine with nine slots and four poles of the rotor:

1. Analysis of the harmonic waves of the magnetomotive force for a specific winding.
2. Examination of specific harmonic waves of the magnetomotive force related to the number of the slots of the stator, as explained on the basis of the example of FIG. 3, for instance, using two identical winding systems which are shifted relative to each other.
3. The selected winding is transformed to the desired stator topology.
4. Several identical concentrated winding systems are combined with each other and mechanically shifted relative to each other. This results in the desired reduction of specific harmonic waves of the magnetomotive force.
5. The winding systems are connected in series and powered by a single inverter ensuring the power supply with several electric phases.

The described approach shall be explained once again in the following with the aid of a second group of exemplary embodiments where a machine with 18 stator slots and ten rotor poles with concentrated windings is striven for.

In analogy to FIG. 1, the implementation of FIG. 14 shows a concentrated winding with n=2, m=3 and Z=12. In this arrangement, however, two coil sets are provided, represented by the term $k_n$=2. Hence, FIG. 14 is a winding distribution with Z=12, $k_n$=2, n=2, m=3.

The associated diagrams of the magnetomotive force and the distribution of the harmonic waves are shown in FIG. 15.

Analogous to FIG. 3, FIG. 16 shows a combination of winding systems which are mechanically shifted relative to each other and are of identical construction. Corresponding to FIG. 3, also FIG. 16 shows factors of influence on the electromotive force for different harmonic waves of the magnetomotive force plotted versus the shift angle between the winding systems. As can be seen, the seventh and eleventh higher harmonic waves are reduced by approximately 75% in case of shifting by four slots. This means that the performance of the winding with $k_n$=2, n=2, m=3 can be significantly improved when using a machine with 18 slots if two identical concentrated winding systems are combined.

The formula for the factors of influence on the electromotive force is already indicated above for FIG. 3 and is not repeated here.

Correspondingly, a transformation of the winding topology with Z=12, $k_n$=2, n=2, m=3 to a winding with 18 slots is performed in the step from FIG. 14 to FIG. 17. The result is shown in FIG. 17 and comprises a winding with Z=18, $k_n$=2, n=2, m=3 and with concentric coils. In analogy to FIG. 4, it is to be seen with the aid of FIG. 17 that winding-free teeth have been inserted between coils of the same phase. The associated diagrams for the magnetomotive force and the distribution of the harmonic waves are shown in FIGS. 18 and 19, where FIG. 18 relates to the case of equal numbers of the conductor sections of the same coil in adjoining slots N1=N2, whereas FIG. 19 elucidates the case of differing numbers of conductor sections of the same coil in adjoining slots N1≠N2 on the basis of an example.

The differing numbers of conductor sections of the same coil in adjoining slots may also be referred to as differing numbers of turns of the two coil sides of a single coil.

FIG. 20 shows a combination of two winding systems according to the proposed principle, which each have the same construction as it is shown in FIG. 17. Here again, the two winding systems are mechanically shifted relative to each other by a defined electric angle, in the present example by four slots. As has been shown above on the basis of FIG. 16, shifting by four slots results in a reduction of the seventh and eleventh higher harmonic waves by 75%. The concentric windings allow a particularly simple manufacture.

FIG. 21 shows the distribution of the magnetomotive force and of the corresponding harmonic waves for the winding of FIG. 20 with Z=18, $k_n$=2, m=3. A further reduction of selected higher harmonic waves can be achieved by differing winding numbers.

If, starting from the example of the proposed principle, two two-layered windings according to FIG. 20 are combined with each other and these combinations of winding systems are again shifted relative to each other by four slots, the winding topology according to FIG. 22 will be produced. The resulting winding has four layers in total, whereby the seventh and eleventh higher harmonic waves are again reduced by 75%, practically effecting an elimination of these higher harmonic waves.

While FIG. 22 shows this winding topology, the corresponding diagrams are indicated in FIG. 23, again verifying the distribution of the magnetomotive force and of the harmonic waves.

The upper picture of FIG. 24 shows clearly that the winding topology of FIG. 22 can be represented in a simplified manner, i.e. with only two layers, wherein the numbers 1 and 2 designate the respective stator teeth, said number of coils being wound around the respective tooth.

As is shown in the middle picture in FIG. 24, the number of the coils of the same phase is identical in some slots; however, these coils exhibit opposite winding senses so that the resultant magnetic force is zero for these coils in these slots. This is why these coils can be removed as shown in the middle representation in FIG. 24. This reduces copper losses in the stator, while the characteristic features of the machine remain unaffected in other respects. Due to the differing numbers of conductor sections in the various slots, the latter can be realized so as to have differing slot depths. This means that some slots as seen in radial direction may protrude more deeply into the stator than others, as measured from the upper edge of the tooth. This is why the stator can be realized so as to have differing slot depths, as shown in the lower picture of FIG. 24.

FIG. 25 shows a comparison of the harmonic waves of the magnetomotive force for the proposed machine with 18 slots and ten poles compared with a machine with twelve slots and ten poles which has a conventional construction.

Whereas differing numbers of conductor sections N1, N2 are used in the same coil in different slots in the example of FIG. 17 in order to reduce the fundamental wave, the example of FIG. 26 of the proposed principle uses coils with differing winding numbers in each case in order to reduce higher harmonic waves. The winding numbers of the respective coil are indicated with first winding number n1 or second winding number n2, which differ from each other. In other respects, the topology of FIG. 26 has the same construction as described in FIG. 20. This means that again the first and second winding systems are shifted relative to each other by four slots, whereas they are of identical construction in all other respects. The use of coils with different winding numbers applies here to adjoining coils of the same phase A, B, C. The symbols n1, n2 identify the winding numbers of these coils.

FIG. 27 shows the associated distribution of magnetomotive force and harmonic waves assuming that:

$$n1 \neq n2,$$

for example n1=k*4 and n2=k*3, with k=1, 2, 3, . . .

FIG. 28 shows a further development of the implementation of FIG. 26. As described in DE 10 2008 057 349 B3, FIG. 28 uses the approach to achieve coils with differing numbers of conductor sections N1, N2 in adjoining slots related to the same coil in that, for instance, the coil in axial direction is not connected from the same side of the stator, but from different sides. In other words, a specific concentric coil in a slot has one conductor section more than in another adjoining slot in which this coil is placed. Instead of designating the number of the conductor sections with the reference numerals N1, N2, these are referred to as n1, n1+1 in the present case for ease of exposition.

Correspondingly, the resulting winding number is 4 in a slot and 3 in the other slot. With this principle, the winding numbers of the same coil in adjoining slots differ by 1 in each case. This allows to additionally reduce the fundamental wave, as is shown impressively in the associated diagrams according to FIG. 29.

FIG. 28 shows a topology of Z=18, $k_n$=2, n=2, m=3 with two winding systems of the same construction and shifted relative to each other, coils with different winding numbers n1, n2 and coils comprising differing numbers of conductor sections in different slots of the same coil; this is illustrated, for instance, with the symbols n1 and n1+1 in FIG. 28.

FIG. 30 shows an exemplary embodiment of an electric machine comprising a stator and a rotor. One of the stators which are described above and have the winding topology described there can be used as a stator according to the proposed principle. The implementation according to FIG. 30 comprises a stator according to the example of FIG. 6.

Similarly, FIG. 31 shows an exemplary embodiment of an electric machine comprising a stator in accordance with the implementation of FIG. 20 as well as a rotor.

It goes without saying that the proposed principle (i.e. inserting winding-free teeth and combining two equal winding systems which are shifted relative to each other) may also be transferred to other winding topologies and stator types without leaving the proposed principle of the invention.

Having explained the proposed principle on the basis of the two groups of exemplary embodiments according to FIGS. 1 to 13 and 14 to 29, respectively, some aspects shall be highlighted in the following which are common to the exemplary embodiments of the proposed principle. In doing so, the following definition of parameters is taken as a basis which identify a concentrated winding:

n number of the adjoining coils of the same phase,
n1, n2 winding number of a coil
N1, N2 number of conductor sections of the same coil in adjoining slots
$k_n$ number of the coil sets,
m number of the electric phases,
Z number of the slots,
q number of the slots per pole per phase and
p number of the pair of poles.

Starting from a conventional concentrated one-phase or multi-phase electric winding, the proposed winding is produced by the following steps.

First, winding-free teeth are inserted in the concentrated winding. This transforms the winding system to a larger number of slots. In a next step, this winding system is identically provided two times in a common stator, the winding systems being shifted relative to each other by a defined number of slots.

The following deliberations are applied here: The general formula for the number of the slots of the stator reads as follows:

$$Z=2*p*q*m.$$

If the number of the coils per phase as well as the number of the electric phases are known, the number of the required stator slots Z for a concentrated winding may be alternatively determined with the rule $$Z=k_n*n*m.$$

In contrast to a conventional winding, the number of the stator slots can be increased for a defined value of ($k_n*m$) in order to improve the winding properties without altering the winding symmetry. Thus, the following rule applies for the number of the stator slots for a concentrated winding which is modified in this way:

$$Z'=k_n*n*m+*m=(n+1)*k_n*m.$$

For the examples of FIG. 1 and FIG. 14 with a corresponding transformation with insertion of winding-free slots applies:

Z6: n=2 & m=3=>Z9: n=2 & m=3

Z12: $k_n$=2, n=2 & m=3=>Z18: $k_n$=2, n=2 & m=3 wherein the corresponding topologies enriched by winding-free teeth are exemplarily shown in FIG. 4 and FIG. 17, respectively. These Figures show that the numbers of the coil sides in the two slots of the respective tooth of the stator differ for the modified winding. There are stator slots which comprise two coil sides in the sense of a two-layer winding, and there are stator slots which comprise only one coil side in the sense of a one-layer winding.

If the number of the stator slots is increased in this way starting from a concentrated conventional winding, the degrees of freedom will be enhanced for the optimization of these winding types, in particular with regard to the reduction of undesired higher harmonic and subharmonic waves. To this end, two winding systems modified in this manner may be combined, which are of identical type and construction, but which are mechanically shifted relative to each other by a defined electric angle, i.e. by a defined number of stator slots. This is shown with the described exemplary embodiments with the aid of FIGS. 6 and 20 showing exemplary embodiments according to the proposed principle.

LIST OF REFERENCE NUMERALS 1 stator
2 rotor
3 slot
4 first winding system
5 second winding system 6 tooth
7 winding-free tooth

The invention claimed is:

1. An electric machine, comprising:
a stator; and
a rotor that can move relative to the stator,
the stator comprising a first and at least one second winding system that have coils which are inserted in slots of the stator and wound around teeth of the stator in each case,
wherein the first winding system and the second winding system each comprise at least one winding-free tooth,
wherein all teeth of the stator are provided with a winding when the first and second winding systems are combined, and
wherein the number of coils per electric phase and per winding system is greater than or equal to two, or the at least one winding-free tooth is positioned directly between the two teeth wound with coils of the same winding system and the same electric phase.

2. The electric machine according to claim 1, wherein the first and the second winding systems each comprise concentrated coils which each are wound around exactly one tooth.

3. The electric machine according to claim 1 or 2, wherein the first and second winding systems combine a one-layer winding and a multi-layer winding with each other.

4. The electric machine according to claim 1, wherein the first and second winding systems each comprise at least two electric phases.

5. The electric machine according to claim 4, wherein the at least one winding-free tooth is arranged between teeth which are wrapped with coils associated to different electric phases.

6. The electric machine according to claim 4, wherein directly adjoining coils of the same electric phase and of the same winding system have different winding numbers.

7. The electric machine according to claim 1, wherein the first and second winding systems each have the same construction, are electrically connected to each other and mechanically shifted relative to each other.

8. The electric machine according to claim 1, wherein the first and second winding systems are serially connected in phase in order to be fed by a common inverter.

9. The electric machine according to claim 1, wherein the stator comprises a third winding system which is mechanically shifted relative to the combination comprising the first and second winding systems.

10. The electric machine according to claim 1, wherein the rotor comprises at least one of the following types: a cage rotor, a multi-layer rotor, a permanent magnet rotor, or a rotor with buried magnets.

11. The electric machine according to claim 1, which is constructed as a machine with an internal rotor or as a machine with an external rotor.

12. The electric machine according to claim 1, which comprises one of the following types: a linear machine, a radial flux machine, an axial flux machine, an asynchronous machine, a synchronous machine, or a brushless DC machine.

13. The electric machine according to claim 1, wherein the number of the conductor turns of the same coil is different in adjoining slots.

* * * * *